United States Patent
Vissamsetty et al.

(10) Patent No.: US 11,038,658 B2
(45) Date of Patent: Jun. 15, 2021

(54) DECEIVING ATTACKERS IN ENDPOINT SYSTEMS

(71) Applicant: Attivo Networks Inc., Fremont, CA (US)

(72) Inventors: Venu Vissamsetty, San Jose, CA (US); Muthukumar Lakshmanan, Bangalore (IN)

(73) Assignee: ATTIVO NETWORKS INC., Fremont, CA (US)

( * ) Notice: Subject to any disclaimer, the term of this patent is extended or adjusted under 35 U.S.C. 154(b) by 98 days.

(21) Appl. No.: 16/420,074

(22) Filed: May 22, 2019

(65) Prior Publication Data

US 2020/0374087 A1 Nov. 26, 2020

(51) Int. Cl.
*H04L 5/00* (2006.01)
*H04L 29/06* (2006.01)
*H04L 12/721* (2013.01)
*H04L 29/12* (2006.01)
*H04L 12/823* (2013.01)

(52) U.S. Cl.
CPC ............ *H04L 5/0055* (2013.01); *H04L 45/72* (2013.01); *H04L 47/32* (2013.01); *H04L 61/256* (2013.01); *H04L 61/2592* (2013.01); *H04L 63/0428* (2013.01); *H04L 63/1491* (2013.01); *H04L 69/16* (2013.01)

(58) Field of Classification Search
CPC ....... H04L 5/0055; H04L 69/16; H04L 45/72; H04L 63/0428; H04L 61/256; H04L 47/32; H04L 63/1491; H04L 61/2592; H04L 12/4633; H04L 63/0209; H04L 61/2015; H04L 63/1416
See application file for complete search history.

(56) References Cited

U.S. PATENT DOCUMENTS

| | | | | |
|---|---|---|---|---|
| 7,464,407 B2* | 12/2008 | Nakae | ............... | H04L 63/0227 713/182 |
| 7,958,549 B2* | 6/2011 | Nakae | ............... | H04L 63/101 726/11 |
| 2002/0194489 A1* | 12/2002 | Almogy | ............ | H04L 63/1491 726/24 |
| 2006/0230129 A1* | 10/2006 | Swami | ............ | H04W 12/1204 709/223 |
| 2008/0022000 A1* | 1/2008 | Furuya | ............ | H04L 65/1069 709/228 |
| 2009/0158418 A1* | 6/2009 | Rao | ............ | H04L 63/0272 726/12 |
| 2012/0185563 A1* | 7/2012 | Sugiyama | ............ | H04L 63/029 709/217 |

(Continued)

*Primary Examiner* — Abdullahi E Salad
(74) *Attorney, Agent, or Firm* — David R. Stevens; Stevens Law Group (57) ABSTRACT

An endpoint executes a deflection service that detects failed connection attempts (TCP RST packets) and evaluates whether they are likely the result of a reconnaissance attack. If an inbound connection fails, a connection request packet (TCP SYN) is sent to a decoy server that includes data from the TCP RST packet. The decoy server then completes a connection handshake with a destination of the TCP RST packet and engages a process at the destination. If an outbound connection fails, the deflection service facilitates a connection between a process executing on the endpoint and the decoy server and associated with a destination port referenced by the TCP RST packet.

17 Claims, 8 Drawing Sheets

(56) References Cited

U.S. PATENT DOCUMENTS

| | | | |
|---|---|---|---|
| 2014/0150094 A1* | 5/2014 | Rao | H04L 63/1458 |
| | | | 726/22 |
| 2015/0257194 A1* | 9/2015 | Cho | H04L 43/028 |
| | | | 370/329 |
| 2017/0331856 A1* | 11/2017 | Vissamsetty | H04L 63/1491 |
| 2018/0063187 A1* | 3/2018 | St. Pierre | H04L 63/1433 |
| 2019/0068642 A1* | 2/2019 | Araujo | H04L 63/1425 |

* cited by examiner

DECEIVING ATTACKERS IN ENDPOINT SYSTEMS

BACKGROUND

Lateral movement is a technique used by attackers to move inside a network while looking for key targets with valuable data. An attacker typically gets foothold on a production asset and starts using that asset to move laterally in the network. Since an attacker typically has little information about the network the endpoint is in, attack attempts are made on multiple targets before finding a target of interest. The systems and methods disclosed herein provide an improved approach for detecting and preventing lateral movement from endpoint systems.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
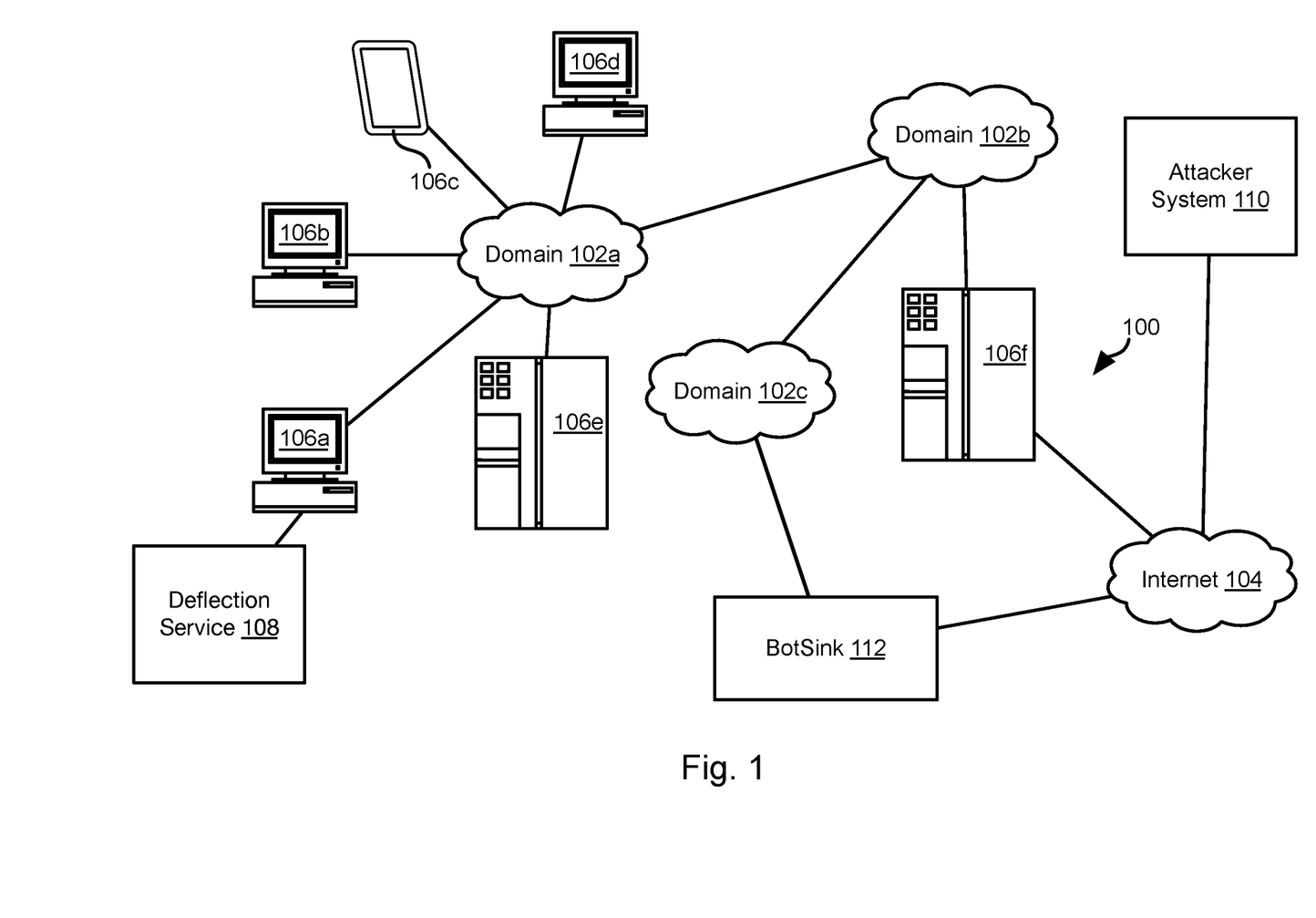
FIG. 1 is a schematic block diagram of a network environment for performing methods in accordance with an embodiment of the present invention.

Referring to FIG. 1, the methods disclosed herein may be practiced in a network environment 100 including a plurality of domains 102a-102c. The domains 102a-102c may be any network division, such as a subnet, local area network (LAN), virtual local area network (VLAN), or the like. The domains 102a-102c may be distributed within a same building or over a large geographic area with interconnecting links including the Internet 104. The illustrated domains 102a-102c may represent one or more network components, such as routers, switches, servers, and the like that implement routing of traffic within the domains 102a-102c and control traffic flowing into and out of the domains 102a-102c.

Each domain may include one or more endpoints 106a-106f. The endpoints 106a-106f are production computing devices that operate as personal computers for users or servers providing production services to other endpoints or to external computers accessing the network environment by way of the internet 104. The endpoints 106a-106f may be desktop or laptop computers, mobile phones, tablet computers, server computers, and any other type of computing device. Some endpoints 106a-106f may include internet-enabled devices, i.e. so-called internet of things (IoT) devices that are often a vulnerability.

The endpoints 106a-106f are not dedicated honeypots, but rather perform non-decoy functions and process legitimate production data and legitimate production tasks of an enterprise, such as functioning as user computers executing applications such as word processors, browsers, graphics programs etc. The endpoints 106a-106f may also function as web servers, database servers, remote login servers, application servers, and the like.

Some or all of the endpoints 106a-106f may host a deflection service 108 that detects suspected reconnaissance by suspicious processes executing on the endpoint 106a-106f hosting the deflection service 108 or suspected reconnaissance connections from another endpoint 106a-106f or an attacker system 110 connecting to the endpoint 106a-106f by way of the internet 104.

A BotSink 112 may be connected to one or more of the domains 102a-102c directly or by way of the Internet 104. The BotSink 112 may function as a decoy server, e.g., honey pot, programmed to engage an attacker while preventing access to production data or computer systems. For example, the BotSink 112 may execute one or more virtual machines implementing network services that engage and monitor malicious code while preventing access to other endpoints 106a-106f of the network. The BotSink 112 may implement any of the method methods for detecting and engaging malicious code disclosed in the following applications (herein after "the incorporated applications"), which are hereby incorporated herein by reference in their entirety:

U.S. application Ser. No. 14/458,026, filed Aug. 12, 2014, and entitled DISTRIBUTED SYSTEM FOR BOT DETECTION;

U.S. application Ser. No. 14/466,646, filed Aug. 22, 2014, and entitled EVALUATING URLS FOR MALICIOUS CONTENT;

U.S. application Ser. No. 14/549,112, filed Nov. 20, 2014, and entitled METHOD FOR DIRECTING MALICIOUS ACTIVITY TO A MONITORING SYSTEM;

U.S. application Ser. No. 15/157,082, filed May 17, 2016, and entitled EMULATING SUCCESSFUL SHELLCODE ATTACKS;

U.S. application Ser. No. 14/805,202, filed Jul. 21, 2015, and entitled MONITORING ACCESS OF NETWORK DARKSPACE;

U.S. application Ser. No. 14/965,574, filed Dec. 10, 2015, and entitled DATABASE DECEPTION IN DIRECTORY SERVICES;

U.S. application Ser. No. 15/142,860, filed Apr. 29, 2016, and entitled AUTHENTICATION INCIDENT DETECTION AND MANAGEMENT;

U.S. application Ser. No. 15/153,471, filed May 12, 2016, and entitled LURING ATTACKERS TOWARDS DECEPTION SERVERS;

U.S. application Ser. No. 15/204,779, filed Jul. 7, 2016, and entitled DETECTING MAN-IN-THE-MIDDLE ATTACKS; and U.S. application Ser. No. 15/360,117, filed Nov. 23, 2016, and entitled IMPLEMENTING DECOYS IN NETWORK ENDPOINTS.

Figure 2:
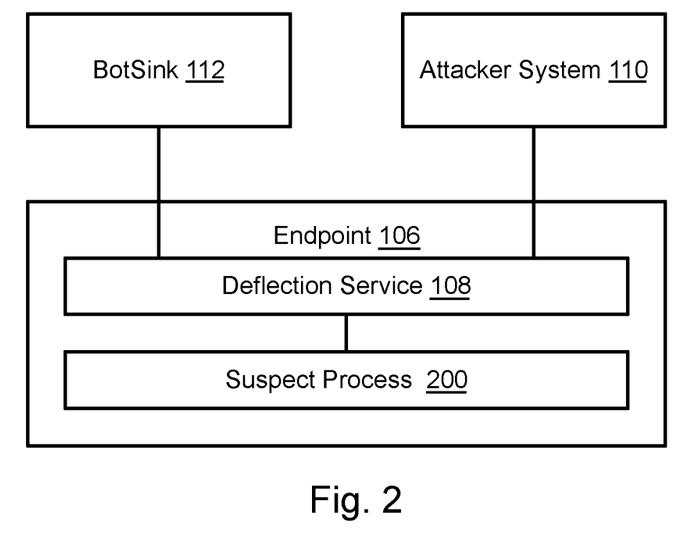
FIG. 2 is a diagram illustrating a system for deflecting reconnaissance attempts in accordance with an embodiment of the present invention.

Referring to FIG. 2, an endpoint 106 (e.g., any one of the endpoints 106a-106f) may execute a deflection service 108. The deflection service 108 detects reconnaissance attempts including inbound connection attempts from an external attacker system 110 or from another endpoint that is executing malicious code. The deflection service 108 further detects outbound reconnaissance attempts by a suspicious process 200 executing on the endpoint 106 itself. Both inbound and outbound connection attempts that are deemed suspicious may be deflected to the BotSink 112 that functions as a decoy server. The manner in which the deflection service 108 detects reconnaissance connections and in which the BotSink 112 handles deflected connections is described in greater detail below.

Figure 3:
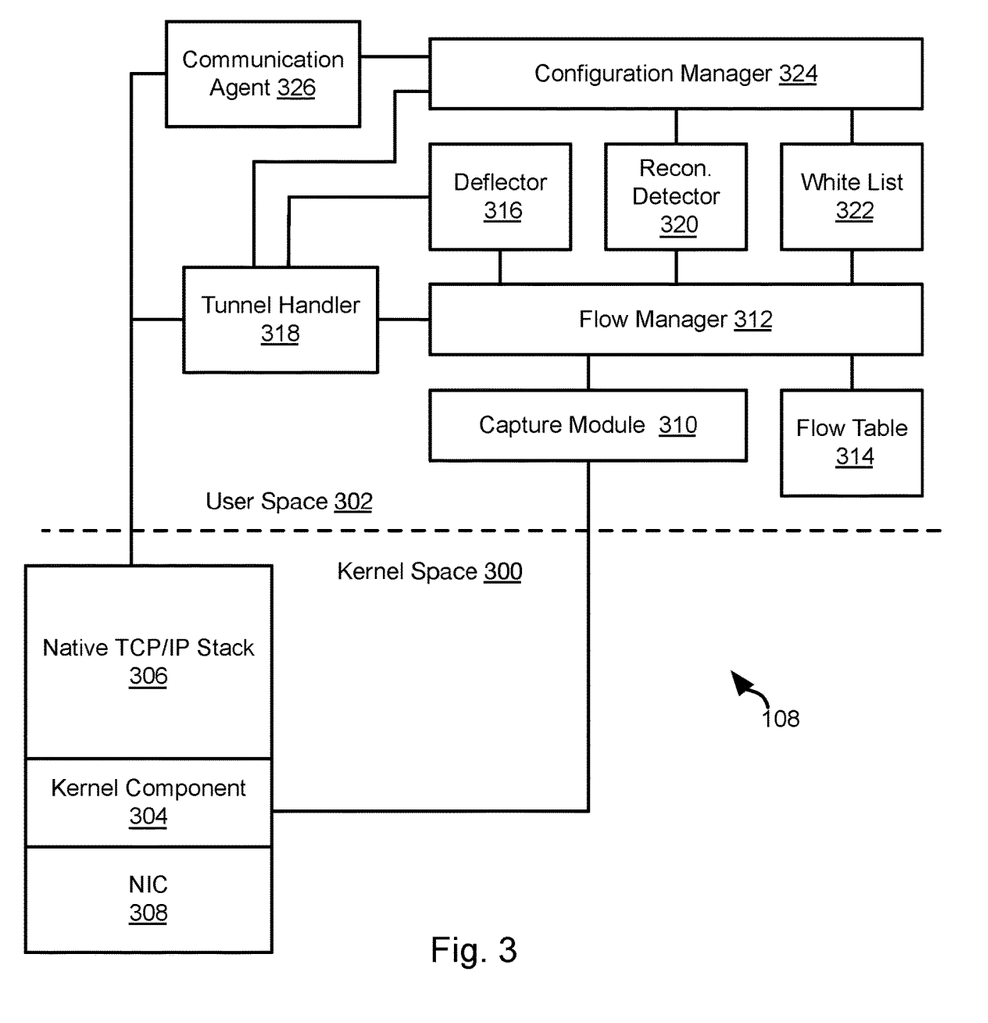
FIG. 3 is a process flow diagram of components on an endpoint for deflecting reconnaissance attempts in accordance with an embodiment of the present invention.

FIG. 3 is a block diagram of the deflection service 108 executing on the endpoint 106. In the following description "the endpoint 106" refers to the endpoint executing the instance of the deflection service 108 discussed below and "other endpoint" refers to a different endpoint (that may be executing its own service 108) that is attempting to connect to the endpoint 106.

As is apparent, the deflection service 108 includes components in kernel space 300 and in user space 302 of the endpoint 106. As known in the art, processes and applications launched by a user execute in a user space corresponding to the user account or context in which the process or application was launched. Accordingly, the process or application has access to a virtual address space corresponding to the user space but not to address space that are reserved for the operating system or the user spaces of other users. The operating system itself operates in kernel space and all processes that operation in kernel space have access to the entire virtual address space of the kernel. Operating system components executing in kernel space include device drivers, the network protocol stack, network interface controller, and other basic functions of the operating system.

The deflection service 108 includes a kernel component 304 that operates in the kernel space 300. In particular, the kernel component may be interposed between the TCP/IP (TCP=transport control protocol, IP=internet protocol) stack 306 and the network interface controller (NIC) 308 of the operating system on the endpoint 106. The kernel component 304 routes certain packets a capture module 310 of the deflection service 108 that operates in user space. TCP handshake packets (TCP SYN, TCP RST, TCP SYN-ACK, but not the TCP ACK packet in some embodiments) for connections that have not previously been determined to be suspicious and therefore deflected to the BotSink 112 may be routed to the capture module 310. For example, copies of TCP SYN and TCP SYN ACK packets may be sent to the capture module whereas the original packets are routed to their destination address without being routed to the capture module 310. TCP RST packets are dropped and a copy is provided to the capture module 310. If the copy of the TCP RST packet is not deflected according to the methods described herein, a copy of the TCP RST packet is injected back into the network stack 306 and routed to its destination address.

Packets of connections previously determined to be suspicious according to the methods disclosed herein are routed by the kernel component 304 to the capture module 310 regardless of whether the packets are TCP handshake packets. For example, the kernel component 304 may modify a flow cache that is part of the kernel component 304 or stored elsewhere in kernel space 300. Entries in the flow cache include identifying information for a connection, such as "five tuple" information of packets to be deflected, the five tuple information being the source address, destination address, source port, destination port, and protocol of packets of the connection. Packets having five tuple information matching an entry in the flow cache will then be deflected by the kernel component 304 to the capture module 310 without waiting for a decision from user space 302 indicating that the connection is to be deflected.

In contrast, in some embodiments, TCP RST packets that do not match an entry in the flow cache may be dropped by the kernel component 304 and not transmitted. Each dropped TCP RST packet is provided to the capture module 310 in user space 302 and evaluated as described herein. When the decision in user space 302 indicates that the packet may be transmitted to its destination address, which may be an external address or a process listening to a destination port referenced by the packet, a copy of the packet is injected back into the stack 306 and transmitted. Otherwise, the packet is deflected and no copy is injected back into the stack 306. In some embodiments, all TCP handshake packets are forwarded to the flow manager 312 for evaluation regardless of whether a matching entry is found in the flow cache.

Intercepted packets may be sent to a flow manager 312 in user space for processing. Intercepted packets for connections already deemed suspicious are identified using a flow table 314. In particular, the flow table 314 may list five-tuple information for connections deemed suspicious: source address, destination address, source port, destination port, and protocol. Additional information included in the flow table 314 for a connection may include the MAC (machine access code) of the external device from which the packets were received. This MAC address may then be inserted into packets in user space 302 when packets are sent back to the attacker through the stack 306 according to the methods disclosed herein (e.g., packets from the BotSink 112).

Packets with five tuple information matching an entry in the flow table 314 may be provided to a deflector 316 that forwards these packets to the BotSink 112. Deflected packets may be sent by way of an encrypted tunnel to the BotSink 112. For example, a tunnel handler 318 encrypts the deflected packets and addresses them to the BotSink 112, such as by way of a UDP (user datagram protocol) connection, TCP connection, or an encrypted tunnel implemented over some other type of protocol. The encrypted packets may be inserted into the TCP/IP stack 306 and transmitted to the BotSink 112 by the NIC 308. The tunnel handler 318 likewise decrypts packets received from the BotSink 112 and returns the decrypted packets to the deflector 316. The deflector 316 returns the packets to the flow manager 312, which injects the decrypted packets into the stack 306 and the NIC 308 transmits the packets to the external address or local port addressed by the packets. In some embodiments a non-encrypted tunnel is used.

TCP/IP handshake packets that do not match an entry in the flow table 314 may be provided to a reconnaissance detector 320 that evaluates whether the handshake packets likely correspond to a reconnaissance attempt by an attacker system, malicious module on another endpoint, or a malicious process on the endpoint 106. An example approach for determining whether handshake packets reconnaissance attempts is described below with respect to FIGS. 4 through 6.

In some embodiments, the user space components of the deflection service 108 further include a whitelist 322 that identifies (by five tuple, process ID, port number, or other identification means) processes and computer system addresses that are not malicious and should not be deflected even if they meet criteria evaluated by the reconnaissance detector 320. For example, a system administrator may invoke execution of a whitelisted scanner that could result in failed connection attempts that would otherwise be deemed suspicious and deflected.

The deflection service 108 may further include a configuration manager 324. The configuration manager 324 may receive configuration parameters from the BotSink 112 or other administrative computer system by way of a communication agent 326. For example, the BotSink 112 may execute an endpoint manager that communicates with the endpoints 106a-106g of a network, provides them with configuration information, and monitors their statuses. In some embodiments, configuration parameters received by the configuration manager 324 will tell the tunnel handler 318 which port it should connect to on the BotSink 112. In other implementations, the BotSink 112 may listen on any port to receive packets from the tunnel handler 318. The BotSink 112 may also communicate with the endpoint using an IP-in-IP tunnel or a GRE (generic routing encapsulation) tunnel.

The configuration information may include encryption keys used by the tunnel handler 318 to encrypt and decrypt data, parameters used by the reconnaissance detector 320 to identify suspicious connections, entries in the whitelist 322, or other parameters. The communication agent 326 may be configured with the address (e.g., IP address) of the BotSink 112 such that on startup of the deflection service 108 on the endpoint, the communication agent 326 may connect to the BotSink 112 to retrieve the configuration parameters.

Figure 4:
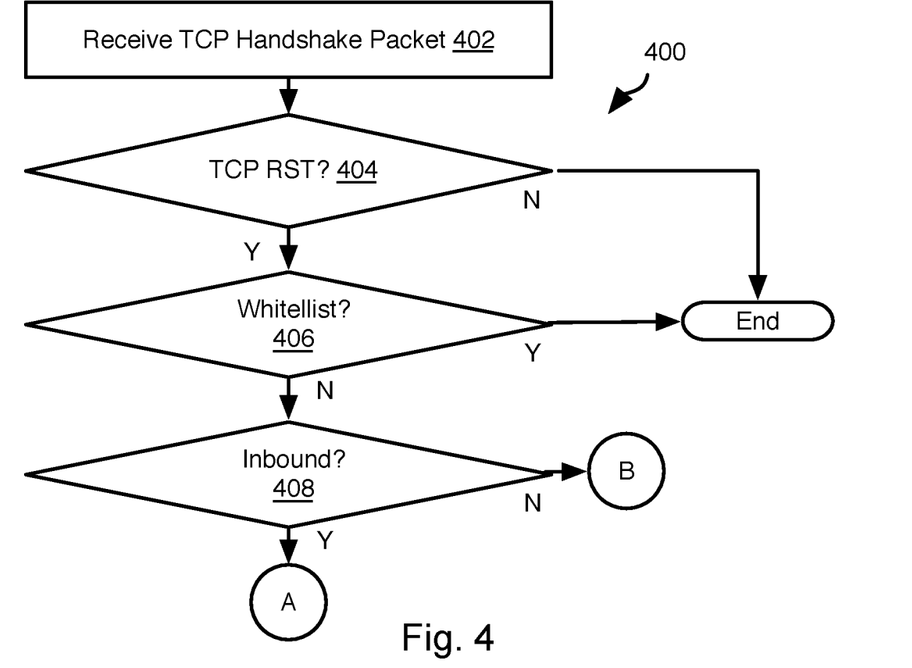
FIG. 4 is a process flow diagram of a method for identifying reconnaissance attempts in accordance with an embodiment of the present invention.

FIG. 4 illustrates a method 400 that may be executed by the user space components of the deflection service 108. The method 400 may include receiving 402 a TCP handshake packet (TCP SYN, TCP SYN-ACK, and TCP RST, but not TCP ACK packets in some embodiments), such as a TCP handshake packet received by the flow manager 312 from the kernel component 304 by way of the capture module 310 or by some other path. TCP SYN is a first packet in the handshake process and indicates an intent to connect to a port indicated in the TCP SYN packet, TCP SYN-ACK is a packet sent in response to the SYN packet indicating that the TCP SYN packet was received and connection to the port specified is accepted, and TCP ACK is a packet sent in response the TCP SYN packet indicating acknowledgment of receipt.

The TCP RST or "reset" packet is sent if no process is listening on the port referenced in the TCP SYN packet. The TCP RST packet could be received from an external system in response to a connection attempt from a process executing on the endpoint 106. The TCP RST could be generated by the NIC 308 or other kernel process in response to detecting an inbound connection attempt that references a port on which no process is listening.

If the TCP handshake packet is found 404 not to be a TCP RST packet, the method 400 ends with respect to the packet received at step 402. If the TCP handshake packet is a TCP RST packet but is found 406 to match an entry in the whitelist 406, then the method 400 also ends with respect to the packet received at step 402.

The method 400 may include evaluating 408 whether the packet from step 402 is for a failed inbound connection attempt (e.g., the source address is that of the endpoint 106 and the destination address that is not that of the endpoint 106) or for a failed outbound connection attempt (e.g., the source address is that of the endpoint 106). If the packet is found 408 to be for an inbound connection, then processing may continue according to the method of FIG. 5. If the packet is found 408 to be for an outbound connection, then processing may continue according to the method of FIG. 6.

Figure 5:
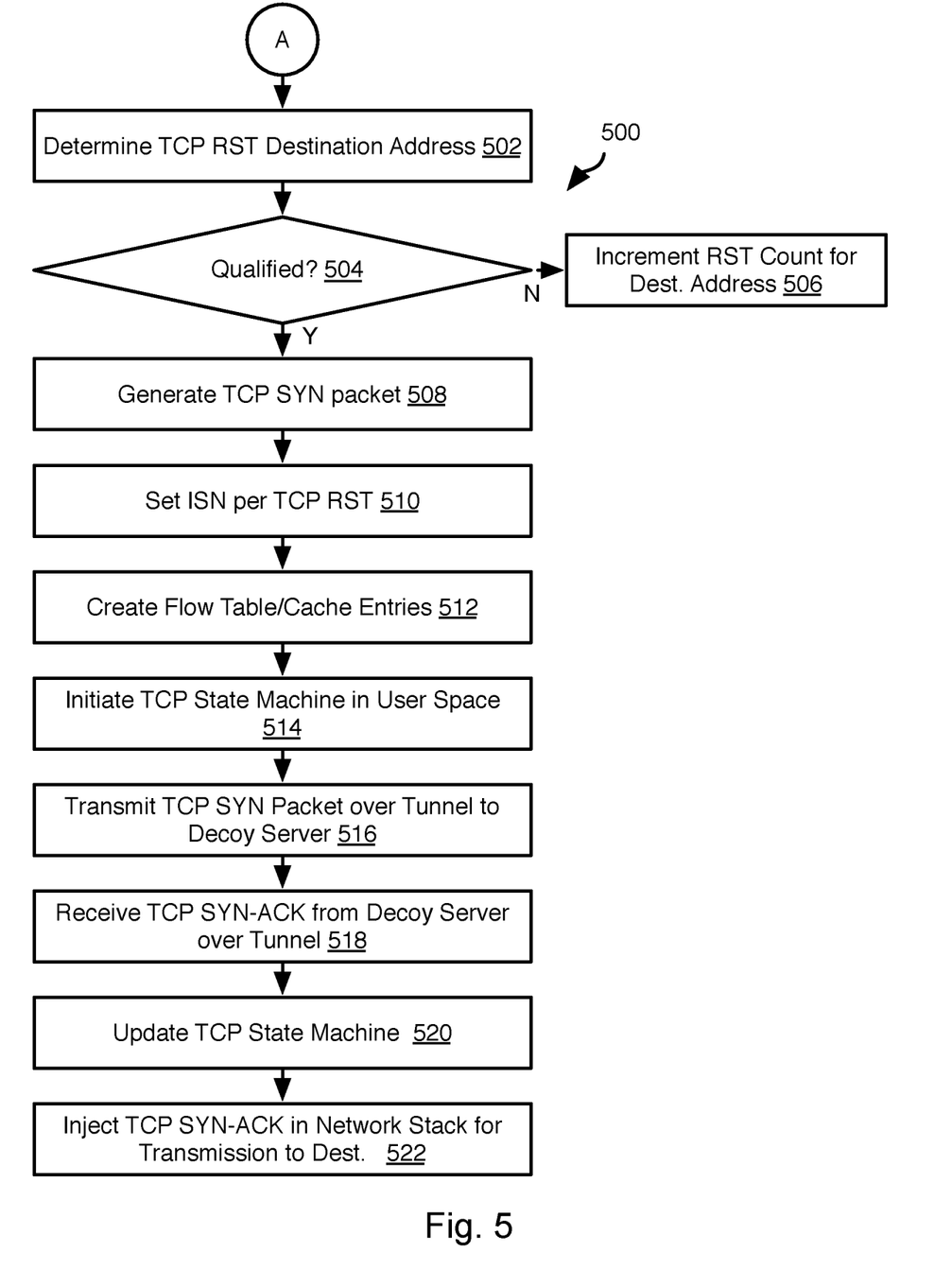
FIG. 5 is a process flow diagram of a method for deflecting inbound reconnaissance attempts in accordance with an embodiment of the present invention.

FIG. 5 illustrates a method 500 for processing a TCP RST packet generated by the endpoint 106 in response to a failed inbound connection attempt. The method 500 may be executed by the flow manager 312 or other component of the deflection service 108. The method 500 may include determining 502 the destination address 502 in the TCP RST packet. Step 502 may further include determining 502 a destination port of the TCP RST packet.

The method 500 may include evaluating 504 whether the destination address qualifies for deflection. In some embodiments, qualification means that there are at least N failed connection attempts from the same destination address, where N is a predefined threshold. In some embodiments, N failed connection attempts to N different port numbers are required before the destination address is deemed qualified for deflection. A failed connection attempt may be deemed to have occurred in response to receiving a TCP SYN packet from the destination address followed by a TCP RST from the protocol stack of the endpoint addressed to the same destination address.

The value of N may be set by the configuration parameters received by the configuration manager 324 from the BotSink 112. For example, a value between one and five, preferably two or three, may be effective to avoid false positives and detect reconnaissance attempts. If the destination address of the TCP RST packet is not found to be qualified, then a counter for the destination address (or for the combination of the destination address and the destination port) may be incremented 506. If the TCP RST packet is the first TCP RST packet including the destination address identified at an iteration of step 502, then a counter may be initiated for the destination address, otherwise an existing counter is incremented 506. When the counter for the destination address is found 504 to be equal to N, the destination address may be found 504 to be qualified to be deflected. In some embodiments, the N failed connection attempts must occur within a predefined time interval before a connection is found to be qualified for deflection. Accordingly, a time of occurrence of each failed connection attempt may be recorded and N may be decremented when the elapsed time from the time of a failed connection attempt is greater than the time interval.

If the destination address is found 504 to be qualified, some or all of the remaining steps of the method 500 may be executed in response. In particular, the method 500 may include generating 508 a TCP SYN packet. The TCP SYN packet may be formatted as a TCP SYN packet according to TCP protocol and have the five tuple information corresponding to the TCP RST packet evaluated at step 502, i.e. a source address set to the destination address in the TCP RST packet, destination address set to the source address of the TCP RST packet (i.e., and address of the NIC or other process that generated the TCP RST packet), source port set to the destination port of the TCP RST packet, destination port set to the source port of the TCP RST packet, and protocol that is the same as in the TCP RST packet.

The method 500 may further include setting 510 the ISN (initial sequence number) of the TCP SYN packet of step 508 to be the acknowledgment number of the TCP RST packet evaluated at step 502 decremented by 1.

The method 500 may further include creating 512 entries in the flow table 314 and the flow cache of the kernel component 304. In particular, an entry in the flow table 314 may be modified to include an entry that includes at least the destination address. Accordingly, all packets received by the flow manager 312 from the destination address will be deflected to the BotSink 112. In some embodiments, the entry will further list a port at the destination address and a port on the endpoint 106 referenced in the TCP RST packet such that only packets from the port at the destination and addressed to the port on the endpoint 106 will be deflected in response to existence of the entry.

Creating 512 the flow cache entry may include creating an entry in the flow cache that routes all packets from the destination address from step 502 (or all packets from the destination address and destination port from step 502) will be intercepted by the kernel component 304 and transmitted to the flow manager 312, such as by way of the capture module 310.

The method 500 may further include initiating 514 a TCP state machine in user space. The TCP state machine may be initiated to a state as defined in the TCP protocol at a point in connection following transmission of the TCP SYN packet. The state machine may be further updated as defined in the TCP protocol for subsequent packets, e.g., a TCP SYN-ACK received from the BotSink 112, and a TCP ACK from the destination address. In particular, the state machine may be updated according to RFC 793 in response to packets exchanged between the BotSink and the destination address. When the state machine indicates that the connection is terminated, references to the connection in the flow table 314 may be deleted to free space for monitoring subsequent connections.

The method 500 may further include transmitting 516 the TCP SYN packet as constituted after steps 508 and 510 to the BotSink 112, such as over an encrypted tunnel, such as the encrypted tunnel managed by the tunnel handler 318.

The method 500 may further include receiving 518 a TCP SYN-ACK packet from the BotSink 112 in response to the TCP SYN packet of step 516. This packet may be received over the encrypted tunnel and decrypted. The TCP state machine from step 514 may be updated 520 in response to receipt of the TCP SYN packet.

The method 500 may further include injecting 522 the TCP SYN-ACK packet from step 518 into the network stack 306 such that the NIC 308 will transmit the TCP SYN-ACK packet to the destination address. The TCP SYN-ACK packet may be modified before transmission such that the source address references the address of the endpoint 106 rather than the address of the BotSink 112. In particular, the packet may be modified to include the MAC address of the device (NIC or other component) of the endpoint that transmitted the TCP RST packet detected at step 402.

Figure 7:
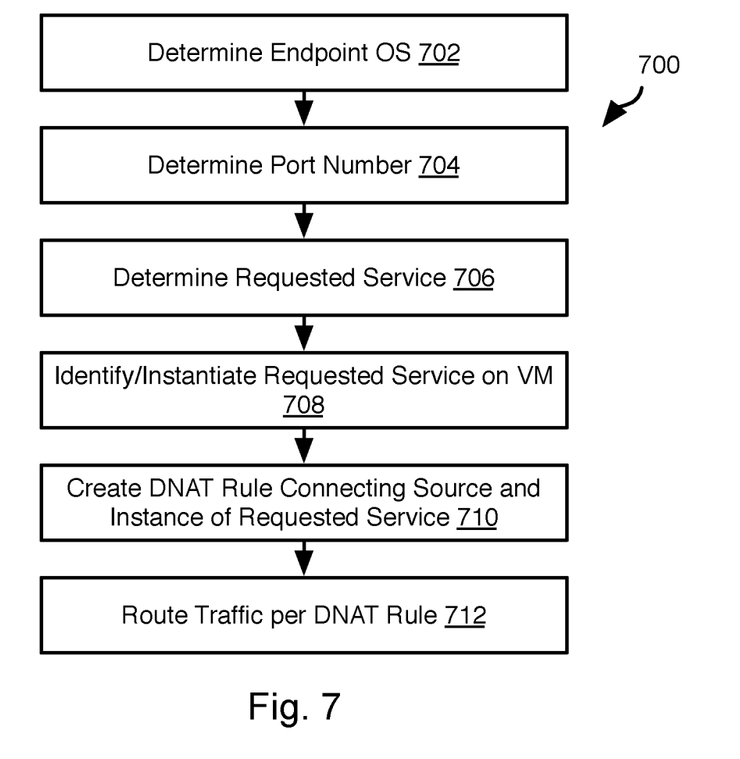
FIG. 7 is a process flow diagram of a method for processing deflected reconnaissance attempts using a decoy server in accordance with an embodiment of the present invention.

Following step 522, communication between the system at the destination address and the BotSink 112 may continue by way of the endpoint 106. Specifically, packets from the BotSink 112 over the encrypted tunnel and addressed to the destination address are routed by flow manager 312 to the TCP/IP stack 306 to be sent to the destination address as defined in the flow table 314 having a source address changed to that of the endpoint 106. Packets from the destination address are intercepted according to the flow cache and sent to the flow manager 312. These packets are encrypted and sent to the BotSink 112 according to the flow table entry 314 referencing the destination address. The manner in which the BotSink 112 engages and monitors the system at the destination address may be according to any of the approaches described in the incorporated applications. FIG. 7 further describes processing that may be performed with respect to packets deflected to the BotSink 112.

Figure 6:
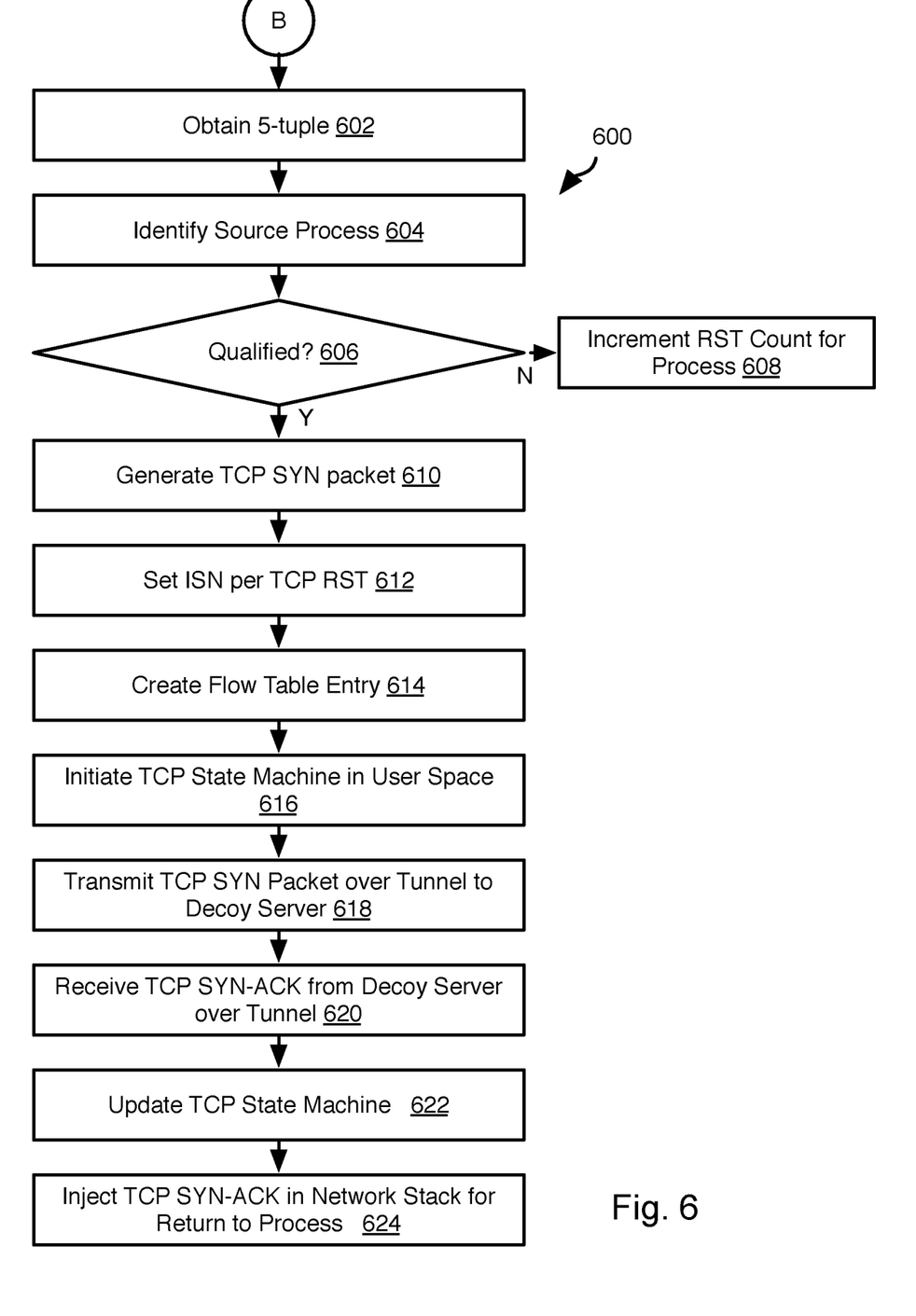
FIG. 6 is a process flow diagram of a method for deflecting outbound reconnaissance attempts in accordance with an embodiment of the present invention.

FIG. 6 illustrates a method 600 for processing a TCP RST packet generated by a computer system other than the endpoint 106 ("the destination system") in response to a failed outbound connection attempt from a process executing on the endpoint 106. The method 600 may be executed by the flow manager 312 or other component of the deflection service 108. The method 600 may include obtaining 602 the five tuple information from the TCP RST packet from step 402 of the method 400 that invoked execution of the method 600. The method 600 may further include using the five tuple information to identify 604 the process that is addressed by the TCP RST packet. For example, the five tuple will include a destination port. The flow manager 312 may therefore evaluate which process ID is connected to the destination port and listening on the destination port.

The method 600 may include evaluating 606 whether the process ID of step 604 qualifies for deflection. In some embodiments, qualification means that the TCP RST was preceded by N other failed connection by the same process ID (i.e. N instances of an outbound SYN packet and corresponding received TCP RST packet for a connection (e.g., five tuple) mapped to the process ID in a TCP connection table), where N is a predefined threshold. In some embodiments, N failed connection attempts to N different ports of a destination address (source ports of TCP RST packets) are required for a connection attempt to be qualified for deflection. In some embodiments, the N failed connection attempts must occur within a predefined time interval before a connection is found to be qualified for deflection. Accordingly, a time of occurrence of each failed connection attempt may be recorded and N may be decremented when the elapsed time from the time of a failed connection attempt is greater than the time interval.

Note that if there is an outbound reconnaissance connection attempt (TCP SYN) to a destination IP address that is not assigned, there will be no TCP RST packet. A number of failed connection attempts by a process ID may therefore also be counted in response to detecting a SYN packet generated by the process ID (as mapped to the process ID in the connection table) that is not followed by a TCP RST or TCP SYN ACK within a threshold time period (e.g., 10 seconds to one minute, preferably between 25 and 35 seconds). In some embodiments, retransmissions are counted as failed connection attempt for a process ID. Retransmissions may be counted in response to a second TCP SYN packet being sent within a threshold time period of a previously sent first TCP SYN matching the five tuple of the second TCP SYN packet.

The value of N may be set by the configuration parameters received by the configuration manager 324 from the BotSink 112. For example, a value between one and five, preferably two or three, may be effective to avoid false positives and detect reconnaissance attempts. If the process ID of step 604 is not found 606 to be qualified, then a counter for the process ID may be incremented 608. If the TCP RST packet is the first TCP RST packet mapped to the process ID at an iteration of step 604, then a counter may be initiated for the process ID, otherwise an existing counter is incremented 608. When the counter for the process ID is found 606 to be equal to N, the process ID may be found 606 to be qualified to be deflected.

If the process ID is found 608 to be qualified, some or all of the remaining steps of the method 600 may be executed in response. In particular, the method 600 may include generating 610 a TCP SYN packet. The TCP SYN packet may be formatted with as a TCP SYN packet according to TCP protocol and have the five tuple information corresponding to the TCP RST packet evaluated at step 602, i.e. a source address set to the destination address of the TCP RST packet (e.g., a NIC or some other component of the endpoint), source address, destination address set to the source address of the TCP RST packet, source port set to the destination port from the TCP RST packet, destination port set to the source ort from the TCP RST packet, and protocol being the same as in the TCP RST packet. Where a reconnaissance attempt is detected in response to retransmissions due to failed connections, the TCP SYN packet may be the TCP SYN packet (e.g., the TCP SYN for a last retransmission) as received from the process that generated it, rather than being synthesized based on a TCP RST packet.

The method 600 may further include setting 612 the ISN (initial sequence number) of the TCP SYN packet of step 610 to be the acknowledgment number of the TCP RST packet evaluated at step 602 decremented by one. Where the TCP SYN is from a retransmission, this step may be omitted.

The method 600 may further include creating 614 entries in the flow table 314 and the flow cache of the kernel component 304. In particular, an entry in the flow table 314 may be modified to include an entry that includes at least the source address of the TCP RST packet (or the destination address of the TCP SYN packet of a retransmission deemed to be a reconnaissance attempt as described above). Accordingly, all packets received by the flow manager 312 having the source address of the TCP RST packet (or destination address of the TCP SYN packet from the retransmission) as the destination address will be deflected to the BotSink 112. In some embodiments, the entry will further list a port at the source address and a port on the endpoint 106 referenced in the TCP RST packet (or referenced in the TCP SYN packet from the retransmission) such that only packets from the port on the endpoint 106 and addressed to the port at the source address will be deflected in response to existence of the entry.

Creating 614 the flow cache entry may include creating an entry in the flow cache that routes all packets addressed to the source address from step 602 (or all packets addressed to the source address and source port from step 602) will be intercepted by the kernel component 304 and transmitted to the flow manager 312, such as by way of the capture module 310.

The method 600 may further include initiating 616 a TCP state machine in user space. The TCP state machine may be initiated to a state as defined in the TCP protocol at a point in connection following transmission of the TCP SYN packet. The state machine may be further updated as defined in the TCP protocol for subsequent packets, e.g., a TCP SYN-ACK received from the BotSink 112, and a TCP ACK from the destination address. As noted above, this may enable the flow manager to delete references in the flow table 314 for connections that have ended as indicated by the state machine.

The method 600 may further include transmitting 618 the TCP SYN packet as constituted after steps 610 and 612 to the BotSink 112, such as over an encrypted tunnel, such as the encrypted tunnel managed by the tunnel handler 318.

The method 600 may further include receiving 620 a TCP SYN-ACK packet from the BotSink 112 in response to the TCP SYN packet of step 516. This packet may be received over the encrypted tunnel and decrypted. The TCP state machine from step 514 may be updated 622 in response to receipt of the TCP SYN packet.

The method 600 may further include injecting 624 the TCP SYN-ACK packet from step 620 into the network stack 306 such that the NIC 308 will transmit the TCP SYN-ACK packet to its destination: the port to which the process ID identified at step 604 is connected. The TCP SYN-ACK packet may be modified before transmission such that the source address is the source address from the TCP RST packet rather than the address of the BotSink 112. This may include adding the MAC address of the external device referenced in the TCP RST packet received at step 404.

Following step 522, communication between the process having the process ID from step 604 and the BotSink 112 may continue by way of the endpoint 106. Specifically, packets from the BotSink 112 over the encrypted tunnel and addressed to the destination port of the process ID identified at step 604 are decrypted routed by flow manager 312 to the TCP/IP stack 306 to be sent to the port to which the process ID is connected as defined the flow table 314. Packets from the process ID (e.g., received at the port to which the process ID is connected) are intercepted according to the flow cache and sent to the flow manager 312. These packets are encrypted and sent to the BotSink 112 according to the flow table 314 entry referencing the process ID (or port to which the process ID is connected). The manner in which the BotSink 112 engages and monitors the process may be according to any of the approaches described in the incorporated applications. FIG. 7 further describes processing that may be performed with respect to packets deflected to the BotSink 112.

FIG. 7 illustrates a method 700 that may be executed by the BotSink 112 in response to receiving a TCP SYN packet transmitted by an endpoint 106 ("the subject endpoint") at steps 522 or 624. The method 700 may include determining 702 an operating system (MAC OSX, WINDOW, LINUX, etc.) executing on the subject endpoint. Determining 702 the operating system may be performed be evaluating information included in the TCP SYN packet, such as by requesting an identifier of the operating system from the configuration manager 324, which returns the identifier of the operating system to the BotSink 112. The operating system may include the type (MAC OSX, WINDOW, LINUX, etc.) as well as a version number.

The method 700 may further include determining 704 the port number from the TCP SYN packet. In particular, the destination port of the TCP SYN packet may be obtained and evaluated to determine 706 a service typically associated with that port number. As known in the art, certain services typically listen to a specific port number on computers on which the services are executing, such as those listed in Table 1, below.

TABLE 1

Service and Port Number Mappings

| Service | Port Number |
|---|---|
| FTP (file transfer protocol) | 20, 21 |
| SSH (secure shell) | 22 |
| Telnet | 23 |
| SMTP (simple mail transfer protocol) | 25 |
| DNS (domain name service) | 53 |
| TFTP (trivial file transfer protocol) | 69 |
| DHCP (dynamic host configuration protocol) | 67, 68 |
| HTTP (hypertext transfer protocol) | 80 |
| POP3 (a mail transfer protocol) | 110 |
| NNTP (network news transfer protocol) | 119 |
| NTP (network time protocol) | 123 |
| IMAP4 (internet message access protocol 4) | 143 |
| LDAP (lightweight directory access protocol) | 389 |
| HTTP (hypertext transfer protocol secure) | 443 |
| IMAPS (IMAP over SSL) | 993 |
| RADIUS (remote authentication dial-in user service) | 1812 |

The method 700 may further include identifying a virtual machine (VM) executing on the BotSink 112 that is executing the operating system identified at step 702 and the service identified at step 706. If a VM executing the determined operating system is not executing, one may be instantiated. Note that there are many versions of each operating system, accordingly the operating system instantiated may be a different version number from the OS determined at step 702, e.g. the available operating system that is closest to the version number determined at step 702. Likewise, if the service determined at step 706 is not executing on a VM executing the operating system determined at step 702, then an instance of the service may be started on a VM executing the operating system determined at step 702.

The method 700 may further include creating 710 a dynamic network address translation (DNAT) rule that maps the address of the subject endpoint and the port number from step 704 to the VM and service (e.g., port at which the service is listening) from step 708. Subsequent traffic to and from the VM and service from step 708 may then be routed 712 according to the routing rule: traffic from the subject endpoint and addressed to the port number from step 704 will be routed to the service (e.g. port number) and VM from step 708. Packets from the VM and service from step 708 referencing the address of the subject endpoint (in the case of an outbound connection from a suspect process) will be sent to the subject endpoint according to the DANT. Packets from the service and VM from step 708 that is addressed to the destination address of an external system referenced by a suspected inbound reconnaissance attack will also be routed to the subject endpoint according to the DNAT rule.

Figure 8:
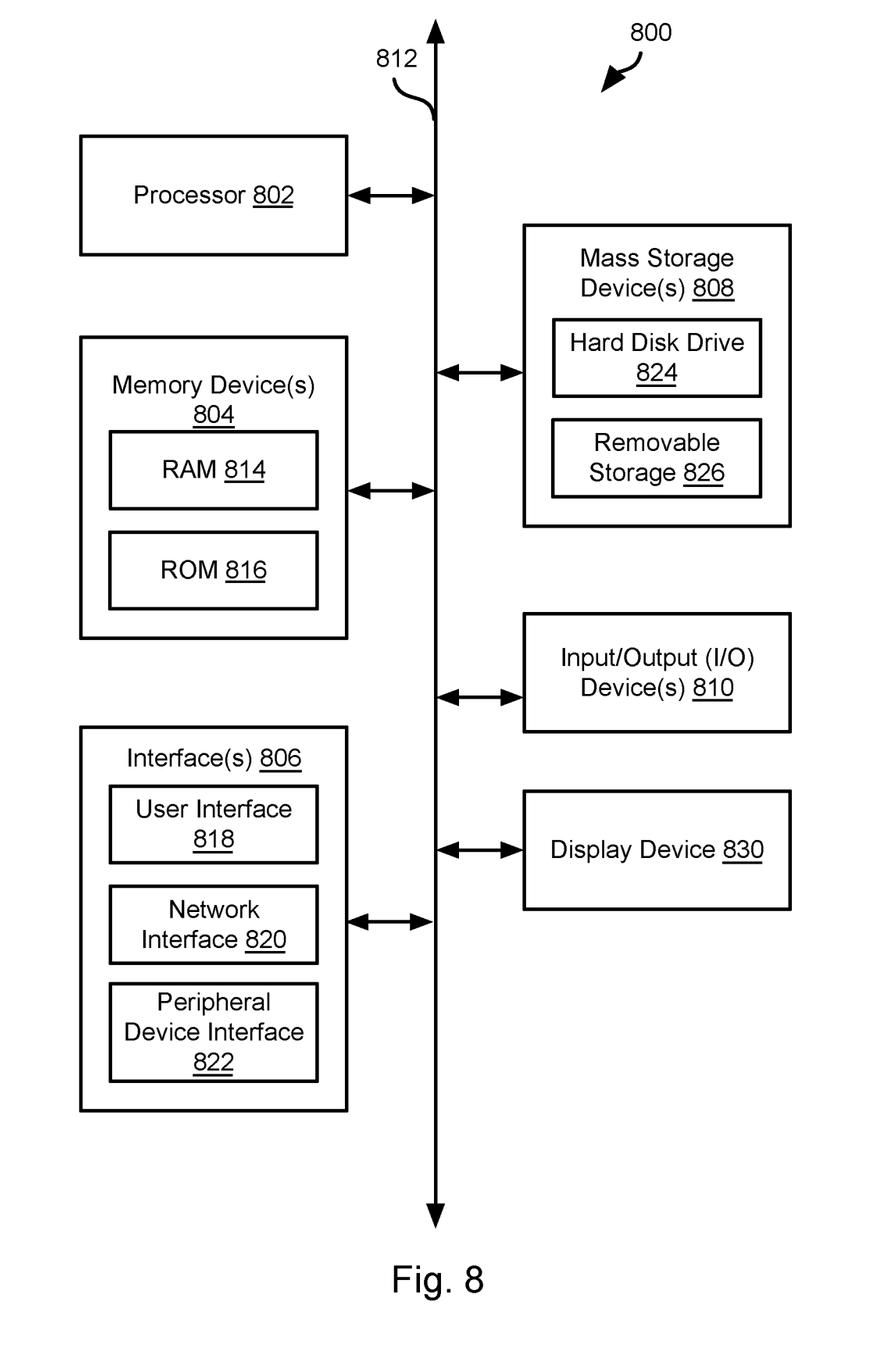
FIG. 8 is a schematic block diagram of a computer system suitable for implementing methods in accordance with embodiments of the present invention.

FIG. 8 is a block diagram illustrating an example computing device 800 which can be used to implement the system and methods disclosed herein. The endpoints 106a-106f, BotSink 112, and attacker system 110 may also have some or all of the attributes of the computing device 800. In some embodiments, a cluster of computing devices interconnected by a network may be used to implement any one or more components of the invention.

Computing device 800 may be used to perform various procedures, such as those discussed herein. Computing device 800 can function as a server, a client, or any other computing entity. Computing device can perform various monitoring functions as discussed herein, and can execute one or more application programs, such as the application programs described herein. Computing device 800 can be any of a wide variety of computing devices, such as a desktop computer, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, etc.), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
   (a) receiving, by an endpoint computer system, a transport control protocol (TCP) reset (RST) packet from a source, the TCP RST packet being formatted according to TCP protocol; and
   in response to (a):
   (b) generating a TCP sync (SYN) packet including data from the TCP RST packet; and
   (c) transmitting over a tunnel the TCP SYN packet to a decoy server that is different from a second computer system referenced by a destination address in the TCP RST packet;
   wherein the source is an interface of the endpoint computer system;
   wherein the data from the TCP RST packet included in the TCP SYN packet includes the destination address from the TCP RST packet as the source address of the TCP SYN packet, the source address from the TCP RST packet referencing the second computer system that is different from the endpoint computer system as the destination address of the TCP SYN packet.

2. The method of claim 1, wherein the data from the TCP RST packet included in the TCP SYN packet includes an initial sequence number (ISN) field of the TCP SYN packet equal to an acknowledgment number of the TCP RST packet decremented by 1.

3. The method of claim 1, further comprising:
   receiving, by the endpoint computer system, a TCP SYN acknowledge (TCP SYN-ACK) packet from the decoy server; and
   transmitting, by the endpoint computer system, at least a portion of the TCP SYN-ACK packet to the second computer system.

4. The method of claim 3, further comprising:
   receiving, by the endpoint computer system, a TCP acknowledge (TCP ACK) packet from the second computer system in response to the at least the portion of the TCP SYN-ACK packet; and
   transmitting, by the endpoint computer system over the tunnel, at least a portion of the TCP ACK packet to the decoy server.

5. The method of claim 1, further comprising:
   implementing, on the decoy server, a service corresponding to a destination port number included in the TCP RST packet;
   establishing, by the decoy server, a TCP connection to a second computer system at a destination address of the TCP RST packet through the endpoint computer system; and
   providing, by the decoy server, the service to the second computer system over the TCP connection through the endpoint computer system.

6. The method of claim 5, further comprising:
   instantiating a virtual machine (VM) executing an operating system corresponding to a type of operating system executing on the endpoint computer system, the service executing within the VM.

7. The method of claim 6, wherein the VM is a first VM of a plurality of VMs, the method further comprising:

defining, by the decoy server, a dynamic network address translation (DNAT) mapping the TCP connection to the first VM; and routing traffic over the TCP connection to and from the first VM according to the DNAT mappinig.

8. The method of claim 1, further comprising:

counting, by the endpoint computer system, a number of SYN packets sent by the second computer system, each SYN packet being sent to a different port number, and that are followed by corresponding TCP RST packets received from the source; and performing (b) and (c) for the TCP RST packet only when the number meets a threshold condition.

9. The method of claim 1, wherein the tunnel is an encrypted tunnel connecting the endpoint computer system to the decoy server.

10. A method comprising:

(a) receiving, by an endpoint computer system, a transport control protocol (TCP) reset (RST) packet from a source, the TCP RST packet being formatted according to TCP protocol;

in response to (a):
  (b) generating a TCP sync (SYN) packet including data from the TCP RST packet; and
  (c) transmitting over a tunnel the TCP SYN packet to a decoy server that is different from a second computer system referenced by a destination address in the TCP RST packet;

providing a kernel component executing in kernel space of the endpoint computer system;

intercepting, by the kernel component, an original TCP RST packet;

dropping, by the kernel component, the original TCP RST packet, providing, by the kernel component, a copy of the original TCP RST packet as the TCP RST packet to a user space component executing in a user space on the endpoint computer system; and performing (a), (b), and (c) by the user space component.

11. The method of claim 10, further comprising:

providing, by the kernel component, all TCP handshake packets to the user space component;

evaluating, by the user space component, the TCP handshake packets;

(d) determining, by the user space component, that first TCP handshake packets of the TCP handshake packets including the TCP RST packet indicate a reconnaissance attempt;

in response to (d), configuring, by the user space component, the kernel component to route packets corresponding to the first TCP handshake packets to the user space component;

(e) determining, by the user space component, that second TCP handshake packets of the TCP handshake packets including the TCP RST packet are not suspicious; and in response to (e), refraining from configuring, by the user space component, the kernel component to route packets corresponding to the second TCP handshake packets to the user space component such that packets corresponding to the second TCP handshake packets are not provided to the user space component.

12. The method of claim 10, further comprising:

receiving, by the user space component, a TCP sync (SYN) acknowledge (ACK) packet over the tunnel from the decoy server;

providing the TCP SYN ACK packet to the kernel component; and injecting, by the kernel component, the TCP SYN ACK packet into a network stack of the of the endpoint computer system.

13. A method comprising:

(a) receiving, by an endpoint computer system, a transport control protocol (TCP) reset (RST) packet from a source that is a second computer system different from the endpoint computer system, the TCP RST packet being formatted according to TCP protocol; and in response to (a):
  (b) generating a TCP sync (SYN) packet including data from the TCP RST packet;
  (c) transmitting the TCP SYN packet over a tunnel to a decoy server that is different from the second computer system and the endpoint computer system, wherein the data from the TCP RST packet included in the TCP SYN packet includes a destination port from the TCP RST packet as a source port in the TCP SYN packet; and wherein the data from the TCP RST packet included in the TCP SYN packet includes an initial sequence number (ISN) field of the TCP SYN packet equal to an acknowledgment number of the TCP RST packet decremented by one.

14. The method of claim 13, further comprising:

receiving, by the endpoint computer system, a TCP SYN acknowledge (TCP SYN-ACK) packet from the decoy server; and providing, by the endpoint computer system, at least a portion of the TCP SYN-ACK packet to a process executing on the endpoint computer system and associated with the destination port from the TCP RST packet.

15. The method of claim 14, further comprising:

receiving, by the endpoint computer system, a TCP acknowledge (TCP ACK) packet from the process; and forwarding, by the endpoint computer system, at least a portion of the TCP ACK packet to the decoy server.

16. The method of claim 13, further comprising:

establishing, by the decoy server a TCP connection to a process executing on the endpoint computer system, the process being connected to a destination port included in the TCP RST packet;

implementing, by the decoy server, a service corresponding to a source port in the TCP RST packet; and engaging, by the decoy server, the process over the TCP connection using the service.

17. A method comprising:

detecting, by an endpoint computer system, multiple retransmissions from a process executing on the endpoint computer system and having a process ID, each retransmission having a TCP SYN packet including a source address and a destination address;

(a) determining that a number of the multiple retransmission for which the TCP SYN packets have identical source and destination addresses meets a threshold condition; and in response to (a):
  (b) transmitting the TCP SYN packet of one of the multiple retransmissions having the identical source and destination addresses (the retransmitted packet) over a tunnel to a decoy server that is different from the endpoint computer system;
  (c) receiving a TCP SYN acknowledge (ACK) packet from the decoy server in response to the retransmitted packet;

(d) providing the TCP SYN ACK packet to the process such that a TCP connection is established between the process and the decoy server; and
(e) engaging the process by the decoy server over the connection.

\* \* \* \* \*